(12) United States Patent
Ohmoto

(10) Patent No.: US 6,807,412 B2
(45) Date of Patent: Oct. 19, 2004

(54) MOBILE WIRELESS TERMINAL SYSTEM WITH SIMULTANEOUS TRANSMISSION FUNCTION

(76) Inventor: Koujiro Ohmoto, 2-15-20-404, Minamiaoyama, Minato-ku, Tokyo, 107-0062 (JP)

( * ) Notice: Subject to any disclaimer, the term of this patent is extended or adjusted under 35 U.S.C. 154(b) by 582 days.

(21) Appl. No.: 09/863,387

(22) Filed: May 24, 2001

(65) Prior Publication Data

US 2002/0028678 A1 Mar. 7, 2002

(30) Foreign Application Priority Data

Jun. 12, 2000 (JP) ........................................ 2000-175072

(51) Int. Cl.⁷ .......................... H04M 11/00; H04Q 7/20
(52) U.S. Cl. ........................ 455/414; 455/412; 455/418; 455/432; 455/455; 455/466
(58) Field of Search .................. 455/455, 517, 455/554, 555, 524, 428, 432, 435, 560, 414, 56.1, 33.1, 34.1, 412, 466, 413, 418, 419

(56) References Cited

U.S. PATENT DOCUMENTS

| | | | |
|---|---|---|---|
| 5,301,359 A | * 4/1994 | Van den Heuvel et al. | 455/524 |
| 5,335,350 A | * 8/1994 | Felderman et al. | 455/17 |
| 5,787,349 A | * 7/1998 | Taketsugu | 455/445 |
| 6,161,016 A | * 12/2000 | Yarwood | 455/445 |
| 6,519,455 B1 | * 2/2003 | McCormick et al. | 455/438 |
| 6,625,460 B1 | * 9/2003 | Patil | 455/466 |

FOREIGN PATENT DOCUMENTS

| | | |
|---|---|---|
| JP | 56-42443 | 4/1981 |
| JP | 08-511920 | 12/1996 |
| JP | 2000-138968 | 1/2000 |
| JP | 2000-115067 | 4/2000 |
| JP | 2000-13864 | 5/2000 |
| WO | WO 94/28687 | 12/1994 |
| WO | WO 99/17568 | 4/1999 |
| WO | WO 99/31828 | 6/1999 |
| WO | WO 99/48250 | 9/1999 |

OTHER PUBLICATIONS

Uyless Black, "Second Generation Mobile and Wireless Networks", Prentice Hall PTR.

* cited by examiner

Primary Examiner—Allan Hoosain
(74) Attorney, Agent, or Firm—McDermott Will & Emery LLP

(57) ABSTRACT

Common dial-up numbers and/or common ID numbers are set for the simultaneous transmission of information, such as news or advertising, to a plurality of mobile wireless terminals. In addition, these common dial-up numbers and/or common ID numbers are also recorded in a switching center that sends out information. When information is sent from the information providers, the switching center simultaneously transmits this information to mobile wireless terminals having these common dial-up numbers and/or common ID numbers.

1 Claim, 5 Drawing Sheets where:
AC   Access control, or authentication center
EIR  Equipment identity register
HLR  Home location register
MS   Mobile station
MSC  Mobile switching center
VLR  Vistor location register

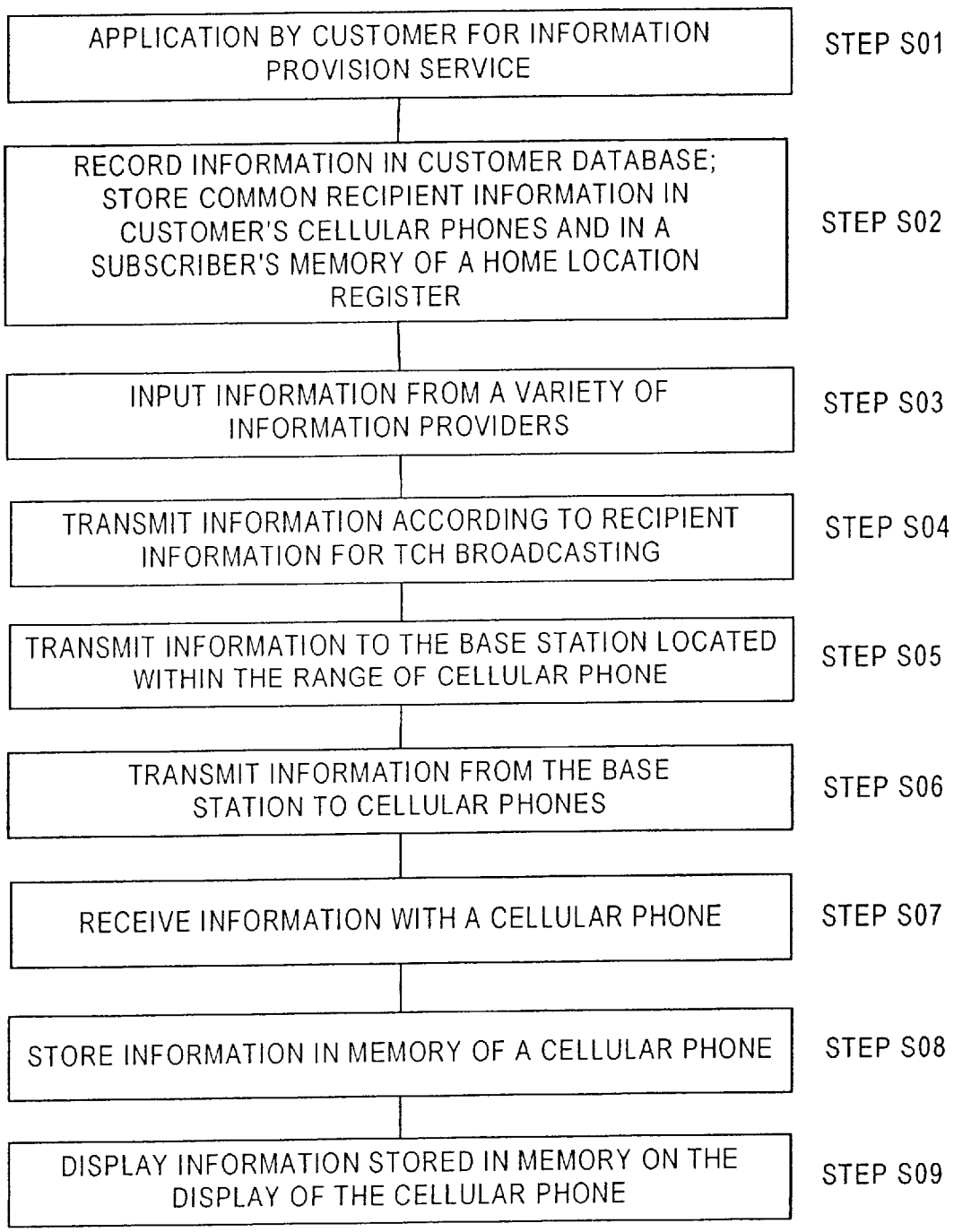

FIG. 7

THE GSM CHANNEL ORGANIZATION

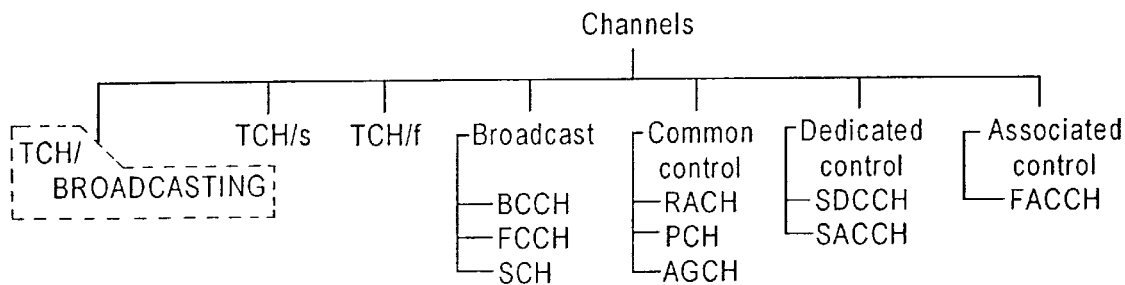

Summary of Channels' Functions and Directions of Transfer:

| | | | |
|---|---|---|---|
| TCH/s | Half rate | | Both directions |
| TCH/f | Full rate (13 kbit/s speech) | | Both directions |
| Broadcast (BCH) | | | |
| | BCCH | Initialization, exchange LAC, MNC, etc. | BS-to-MS |
| | FCCH | Frequency reference | BS-to-MS |
| | SCH | Timing reference | BS-to-MS |
| Common Control (CCCH) | | | |
| | RACH | Request a dedicated channel | MS-to-BS |
| | PCH | Page | BS-to-MS |
| | AGCH | Response to RACH | BS-to-MS |
| Dedicated Control (DCCH) | | | |
| | SDCCH | Signaling information | Both directions |
| | SACCH | Channel maintenance | Both directions |
| Fast Associated Control (FAACH) | | | |
| | | Slot stealing | Both directions |
| Data | 2.4-9.6 kbit/s | | |
| | FDX | TCH/F9.6/F4.8/F2.4 | Both directions |
| | HDX | TCH/H4.8/.4 | Both directions | where:
- AGCH   Access grant channel
- BCCH   Broadcast control channel
- FACCH  Fast associated control channel (steals slots from TCH or SDCCH)
- FCCH   Frequency correction channel
- PCH    Paging channel
- RACH   Random access channel
- SACCH  Slow associated control channel
- SCH    Synchronization channel
- SDCCH  Stand-along dedicated control channel
- TCH    Traffic channels (user payload)

where:
- AC   Access control, or authentication center
- EIR  Equipment identity register
- HLR  Home location register
- MS   Mobile station
- MSC  Mobile switching center
- VLR  Vistor location register

MOBILE WIRELESS TERMINAL SYSTEM WITH SIMULTANEOUS TRANSMISSION FUNCTION

BACKGROUND OF THE INVENTION

1. Field of the Invention

The present invention relates to a mobile wireless terminal system constituted by a plurality of mobile wireless terminals, a mobile wireless terminal switching center, and an information provider connected to a telecommunications business owning this switching center, and more particularly relates to a mobile wireless terminal system having a function for simultaneously transmitting information from the switching center to a plurality of mobile wireless terminals.

2. Description of the Related Art

Following systems are employed for providing information to mobile wireless terminals.

(1) On-demand type: When mobile wireless terminal owners wish to obtain information of some kind, a pre-registered ID number and/or password is inputted in an owner's own mobile wireless terminal and transmitted wirelessly to an information provider. Thus, after receiving this information, the information provider confirms from this ID number and/or password that a sender is a registered user and then transmits the requested information using a telephone number and so forth to the mobile wireless terminal of this user.

(2) Push type: (a) The information provider dials up the mobile wireless terminal with a pre-recorded telephone number and stores the contents of the information in a memory of the mobile wireless terminal in the form of an incoming e-mail and so forth. Alternatively, (b) a special organization such as police simultaneously transmits information at a preset frequency to a plurality of special wireless terminals belonging to a given group for simultaneous transmissions. Or, instead, a small group such as skiers makes simultaneous transmissions of voice and so forth at an identical frequency to wireless terminals consuming very little power and within a narrow area of coverage.

With the on-demand type, when recognizing a need to obtain information, a mobile wireless terminal owner requests the provision of information from a party providing this information. This information provider then sends the requested information to the mobile wireless terminal. That is, to obtain necessary information, mobile wireless terminal owners must use their own mobile wireless terminals to request an information provider to provide this information.

However, the on-demand type is most often incapable of obtaining information required in an emergency within the most appropriate time scales, for example, warning information relating to earthquakes, tidal waves, typhoons and so forth, constantly changing financial information (for example, information effecting sudden fluctuations in share values, exchange rates and so forth), this information being generally obtained after a substantial period.

Furthermore, the provision of information is requested by mobile wireless terminal users in many cases during ordinary usage periods, such as during the daytime from about 8 a.m. until 11 p.m., which results in congested traffic and requires increase of traffic capacity to a telecommunication business.

Consequently, for obtaining necessary information using a mobile wireless terminal, a push-type information provision system with which information is sent in one direction from information providers is preferable to the on-demand type information provision system, and it is desirable, with this system, information which is not especially urgent be provided at night or in the early morning, such as from 11 p.m. until 8 a.m.

However, even with the push type information provision system, current mobile wireless terminal system requests that information be delivered to individual mobile wireless terminals in sequence based on respective telephone numbers. Therefore, if information is delivered to a plurality of recipients (N mobile wireless terminals), delivery of information to all these mobile wireless terminals takes N times the time it takes to send information to a single mobile wireless terminal.

SUMMARY OF THE INVENTION

It is an object of the present invention to provide a mobile wireless terminal system with simultaneous transmission function that enables the simultaneous transmission of identical information to a plurality of mobile wireless terminals.

The mobile wireless terminal system with simultaneous transmission function according to the present invention is constituted by a plurality of mobile wireless terminals, a mobile wireless terminal switching center, and an information provider connected to the switching center. Further, recipient information, such as telephone numbers and/or ID numbers for simultaneous transmissions, is recorded in this switching center and in this plurality of mobile wireless terminals, and the switching center simultaneously transmits information, sent from information providers, based on telephone numbers and/or ID numbers and so forth. The frequency used in transmitting information is a frequency within a mobile wireless terminal usage band that has been reserved for simultaneous transmissions, or an unoccupied frequency within a mobile wireless terminal usage band that is detected automatically at the time of simultaneous transmissions.

Differences between the system of the present invention and SMS (Short Message Service) Broadcasting in GSM system.

1) In the case of the present invention, dial-up number for simultaneous transmissions is set at the first stage of the connection process. And simulcast is performed with a TCH (traffic channel) by having an information provider dial up the set dial-up number for transmitting information.

In the case of SMS, simulcast code is set in the GSM control channel.

2) SMS is essentially configured to give priority to voice-based telecommunications, not configured to be adapted to sending long messages. Long messages must be dealt with by combining short messages.

Differences between the system of the present invention and Cell Broadcasting in GSM system.

This service is essentially limited to the same cell or to the same region. However, with the present invention, worldwide simulcast is possible.

The present invention differs from GSM SMS Broadcasting and GSM Cell Broadcasting in that, with the present invention, the system can be switched to simulcast at the stage of dialing-up number, and the present invention may be applied to GSM, AMPS or any other wireless transmission system.

Since SMS Broadcasting and Cell Broadcasting are one part of GSM functions, only GSM can be used.

BRIEF DESCRIPTION OF THE DRAWINGS

A further object and feature of the above-mentioned present invention will become evident from the following description of the embodiment, referring to the attached figures, in which:

FIG. 6 is a flow chart to show a series of operations up to the point when a customer owning a mobile wireless terminal receives an information provision service from the switching center.

FIG. 7 is a block diagram showing the present invention included figure of the constitution of the wireless channel (GSM channel) in the mobile wireless terminal system (since the channel constitution varies in accordance with the wireless system, the constitution shown is given as one example of such a constitution).

DETAILED DESCRIPTION OF THE PREFERRED EMBODIMENTS

In the present invention, a mobile wireless terminal system which enables information with identical content to be simultaneously transmitted from switching centers to a plurality of mobile wireless terminals (including cellular telephones) is constructed, by setting common dial-up numbers and/or common ID numbers for each of these wireless terminals. The process of simultaneously transmitting this information to a plurality of mobile wireless terminals is hereinafter referred to as 'TCH broadcasting'.

Figure 1:
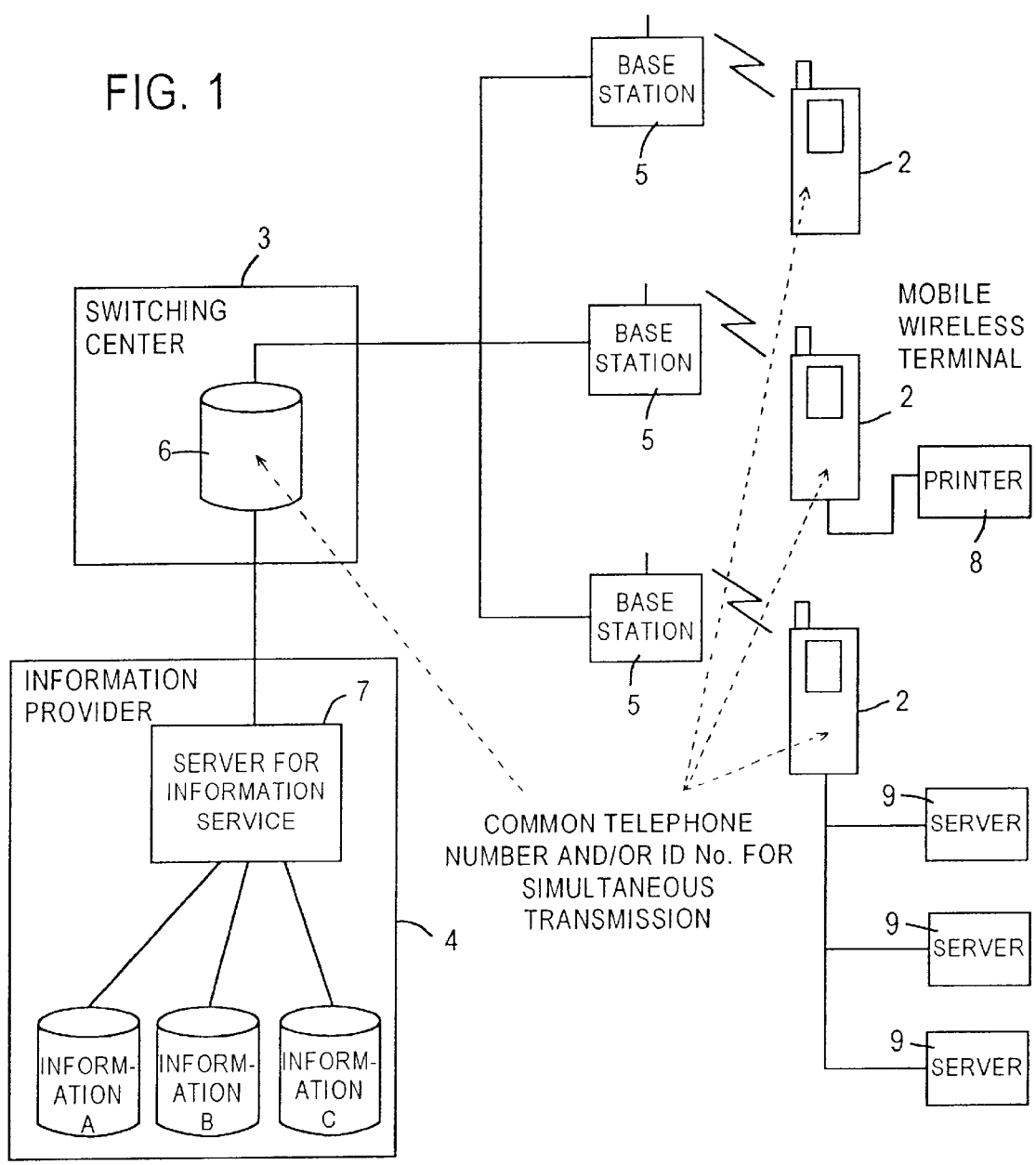
FIG. 1 is a block diagram outlining the mobile wireless terminal system with simultaneous transmission function according to the present invention.

One embodiment of a mobile wireless terminal system comprising a TCH broadcasting function, according to the present invention, is illustrated by referring to FIG. 1. In this embodiment, it is possible for common telephone numbers and/or common ID numbers to be set in a plurality of switching centers in common, each having a subscriber memory for mobile wireless terminals with a multiplicity of common telephone numbers and/or common ID numbers. However, a single switching center is shown as an example hereinbelow.

The mobile wireless terminal system with TCH broadcasting function 1 is constituted by a plurality of the mobile wireless terminals 2, a switching center 3 of the mobile wireless terminals 2, and an information provider 4 connected to a telecommunications business owning the switching center 3. In one switching center 3, a plurality of base stations 5, 5, 5, . . . are connected. The base stations 5 and the mobile wireless terminals 2 are connected wirelessly.

The switching center 3 comprises a subscriber memory 6. In the subscriber memory 6, common dial-up numbers and/or common ID numbers are recorded in a plurality of mobile wireless terminals that have joined the service in order to receive information from the switching center 3.

Since it is not possible to identify a home location register of a mobile wireless terminal user by using common dial-up numbers, as is possible with individual dial-up numbers, a customer database which combines common dial-up numbers and individual dial-up numbers is created, and notification of a TCH broadcasting is made, by using this database, in the home location register of each user.

The information provider 4 comprises a server 7 for providing information and files storing various kinds of information (information A, information B, information C, . . . ) for sending to the server 7.

A mobile wireless terminal 2, not shown in the figure, comprises a control circuit which comprises a CPU, ROM and RAM, a wireless transceiver circuit, a voice input-output circuit, a modem circuit, a base band circuit, a keyboard input circuit, a display driver circuit for a display screen, an interface for external device connection, and so forth. Common telephone numbers and/or common ID numbers are stored in the control circuit ROM in each of the mobile wireless terminals 2, in the same way as in the subscriber memory 6 in the switching center 3. Further, as shown in FIG. 1, the servers 9 which store the information received and a printer 8 that prints the information received from the switching center 3, and so forth, can be connected to the mobile wireless terminals 2.

The switching center 3 simultaneously transmits information sent from the information provider 4 to the plurality of mobile wireless terminals having common dial-up numbers and/or common ID numbers. The frequency (hereinafter referred to as 'simulcasting frequency') used by the switching center 3 for TCH broadcasting is a selected fixed frequency that was selected in advance from ordinary telecommunication frequency bands allocated to the switching center 3 that is a telecommunication business, or a frequency unoccupied at the time of TCH broadcasting using Multi Channel Access.

When a specific frequency is set as a simulcasting frequency, in the case where transmissions is made using an identical frequency in adjoining cells, it is difficult to realize a complete synchronization of transmission, and deterioration of the transmission quality becomes an issue. However, for solving this problem regarding simultaneous transmission to a plurality of cells, various kinds of method, such as a carrier wave frequency offset method and modulated waveform offset method, are employed.

On the other hand, when an unoccupied frequency is set as a simulcasting frequency, this setting is made by using an unoccupied channel selection method (Dynamic Channel Access) employed by ordinary cellular telephones, and the unoccupied channel selection method according to the present invention is also the same as this method.

Figure 8:
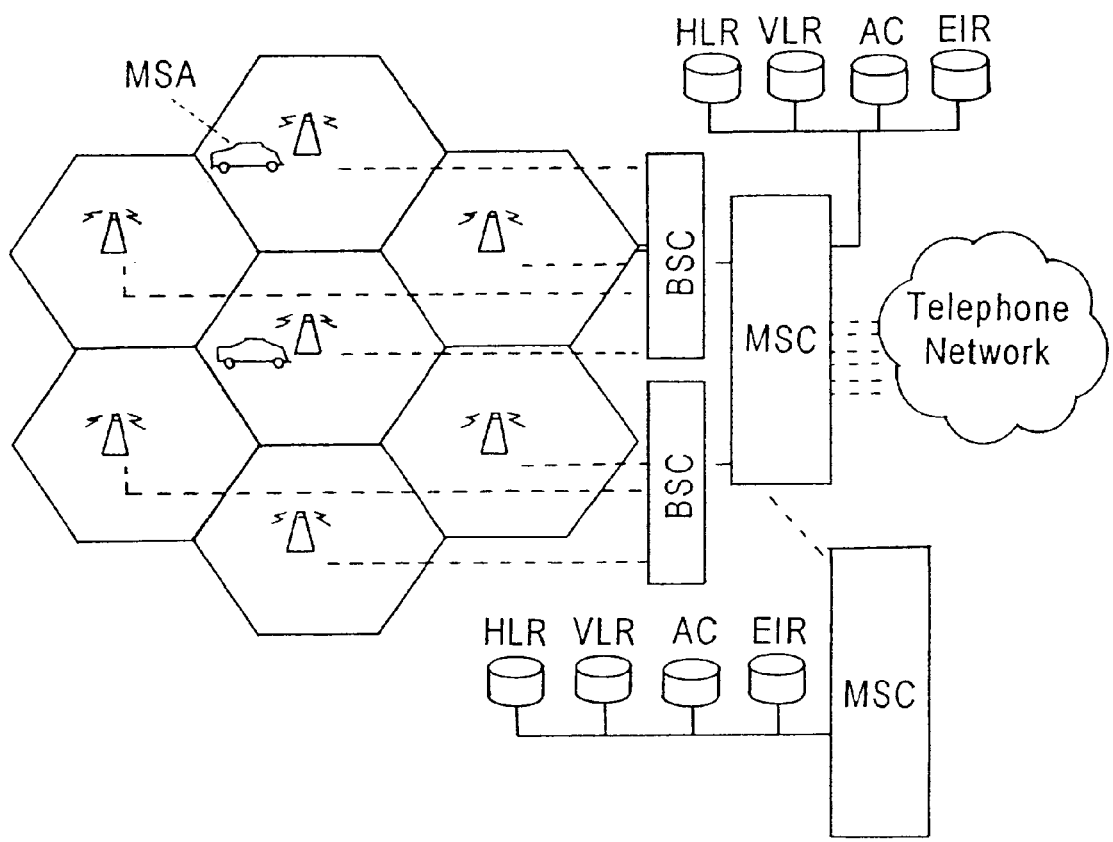
FIG. 8 is a figure showing one example of the current mobile terminal wireless arrangement.

When a telecommunications business owns a plurality of switching centers, an identical simulcasting frequency may be set for each of these switching centers, or else a different simulcasting frequency may be set for each of these switching centers. Further, the telecommunications business sets a specific switching center (home location register) for each customer and registers a dial-up number and/or ID number of each customer in the subscriber memory 6 of the home location register. Then information transmitted by a provider is transmitted, via the switching centers for transmissions to mobile wireless terminals which have common dial-up numbers and/or common ID numbers, to all the mobile wireless terminals in which common dial-up numbers and/or common ID numbers are registered (see FIG. 8).

Figure 2:
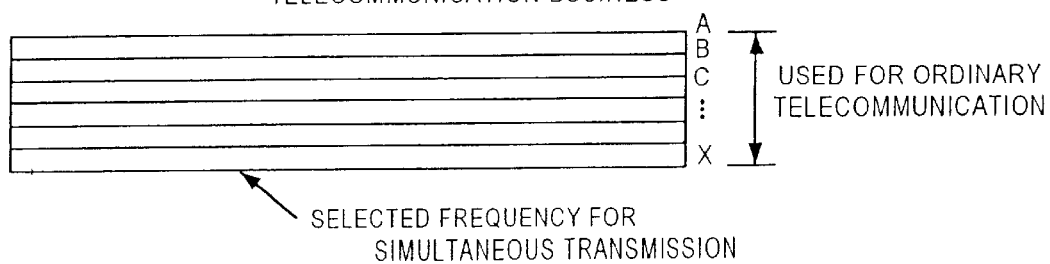
FIG. 2 is a figure showing one aspect of the simulcasting frequency when a specific frequency is set in advance for simultaneous transmission within a frequency band allocated to a telecommunications business.

An overview of frequency bands allocated to the switching center 3 for ordinary telecommunications with mobile wireless terminals is shown in FIG. 2. FIG. 2 shows a specific channel (frequency) X, selected from the frequency bands (channels A, B, C, . . . X) allocated to the switching center 3, as a simulcasting frequency, and other channels than X as the ones used for ordinary telecommunications.

Alternatively, instead of reserving one part of the allocated frequency bands (channels A, B, C, . . . X) as the simulcasting frequency in advance, separately from frequencies for ordinary telecommunications, a frequency, which is unoccupied at the time of TCH broadcasting, is automatically detected and this detected frequency may be established as the simulcasting frequency at the time.

Both the cases mentioned above, where the simulcasting frequency is set in advance or where an unoccupied frequency is automatically detected and this detected frequency is set as a simulcasting frequency at the time, ca be applied to a variety of encoded signals in systems including TDMA (time division multiple access) and W-CDMA (code division multiple access). Essentially, these TDMA and CDMA systems are coding systems, and since the senders and recipients do not change, the TCH broadcasting according to the present invention can be applied to either system. An explanation of the application of each of the systems to the present invention is given hereinbelow.

Figure 3:
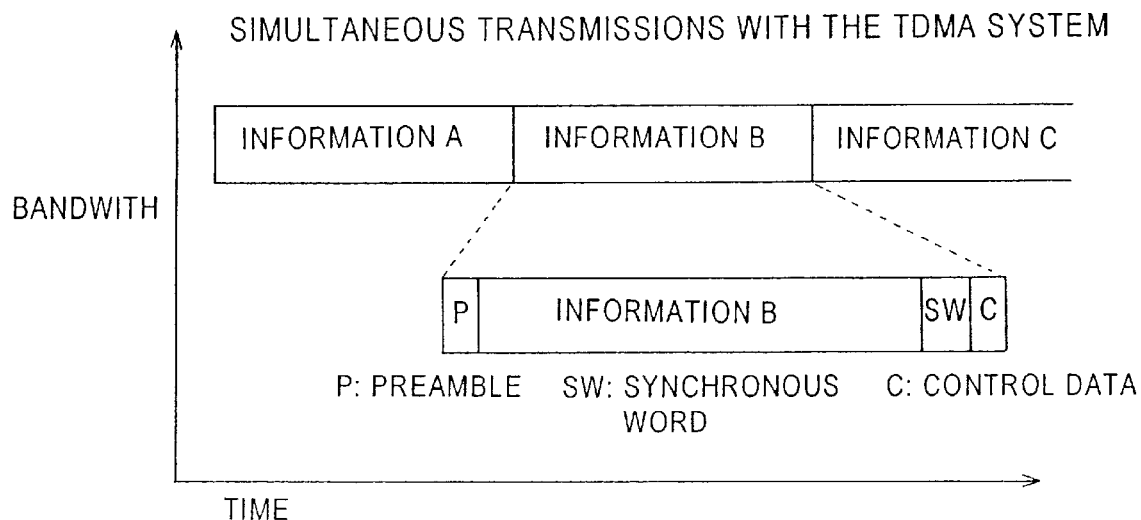
FIG. 3 shows an overview of simultaneous transmissions with the TDMA system, by which a plurality of items of information are transmitted in sequence using an identical frequency.

FIG. 3 shows a case where a variety of information (information A, information B, information C, . . . ) is transmitted with the TDMA system using a simulcasting frequency. First, information A is simultaneously transmitted to a plurality of mobile wireless terminals having a common dial-up number and/or common ID number. When the TCH broadcasting of information A is complete, information B is simultaneously transmitted to these mobile wireless terminals. Then, when the TCH broadcasting of information B is complete, information C is simultaneously transmitted to these mobile wireless terminals. (Since the constitution of each frame varies according to the transmission system, one reference example is illustrated).

Figure 4:
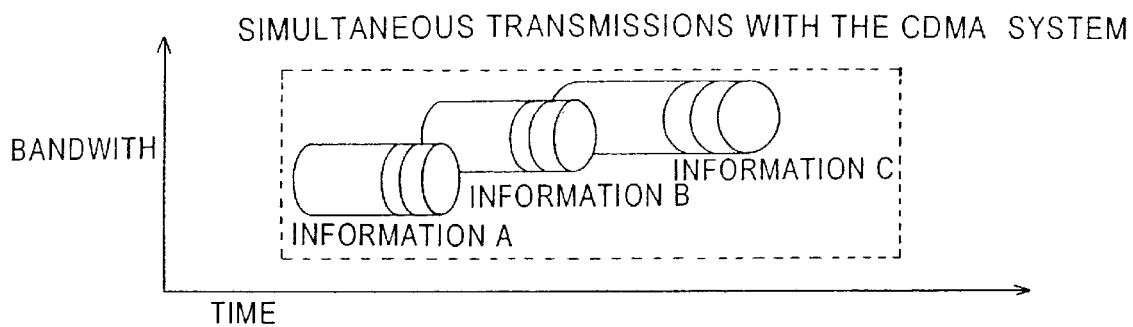
FIG. 4 is a figure showing an overview of simultaneous transmissions with the CDMA system, by which a plurality of items of information are simultaneously transmitted by using a plurality of different frequencies.

FIG. 4 shows a case where a variety of information (information A, information B, information C, . . . ) is transmitted with the CDMA system using a simulcasting frequency. CDMA is a system in which TCH broadcasting is made with a respective code added to a multiplicity of frequencies within a broad frequency bandwidth, and recipients decipher the contents by converting these codes upon reception.

Figure 5:
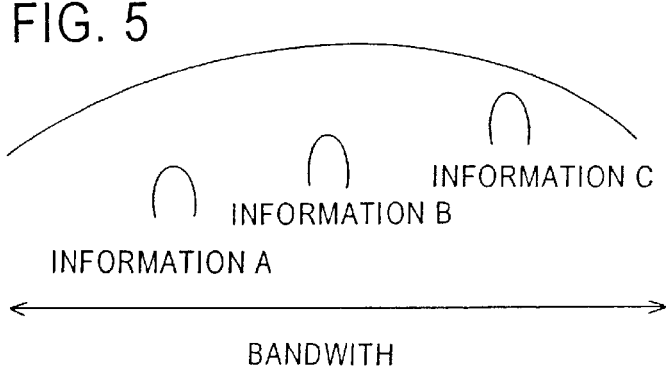
FIG. 5 is a figure showing an overview of a plurality of items of information being transmitted simultaneously with the CDMA system of FIG. 4 at given points in time and using a plurality of different frequencies.

Information A, information B and information C are simultaneously transmitted using a simulcasting frequency that is different from one another (a first, second and third simulcasting frequency). In other words, with this system, information of varied content is simultaneously transmitted, using a plurality of broadcasting frequencies, to a plurality of mobile wireless terminals having a common dial-up number and/or common ID number. FIG. 5 shows the process of simultaneously transmitting information A, information B and information C at a specific point in time, each with a different code within a simulcasting frequency band.

By way of example, in the flow chart of FIG. 6, the procedures are illustrated up to the point where mobile wireless terminal owners (customers) receive a variety of information services, such as news or promotional advertising, via TCH broadcasting from switching centers.

First of all, the customer applies to a telecommunications business expressing the desire to receive an information provision service by way of a TCH broadcasting (step S01).

The telecommunications business then records customer information (full name, gender, address etc.) in the customer database, and upon recording a dial-up number and/or ID number for TCH broadcasting in the subscriber memory 6, the dial-up number and/or ID number for TCH broadcasting are set at the same time in the customer's mobile wireless terminal 2 (step S02).

A plurality of the switching centers 3 each having a subscriber memory 6 in which the dial-up number and/or ID number for TCH broadcasting have been recorded, receiving the dial-up number and/or ID number for TCH broadcasting as well as information such as news or promotional advertising from the information provider 4 (step S03), transmit this dial-up number and/or ID number as well as the information towards a plurality of the base stations 5 by way of a plurality of switching centers 3 (step S04).

The base stations 5 receive the dial-up number and/or ID number as well as the information (step 5), and simultaneously dial up all the mobile wireless terminals 2 having an identical dial-up number and/or ID number within the range of reception using a preset simulcasting frequency (or using a frequency which is unoccupied at this point in time and automatically detected) (step S06).

All the mobile wireless terminals 2 which have an identical dial-up number and/or ID number receive this information (step S07), and the received information is stored in the memory of these mobile wireless terminals 2 (step S08). The information stored in the memory is displayed on a display in the mobile wireless terminals 2, is printed by connecting to a printer, or transferred to a server (step S09).

By way of example, the constitution of wireless channels in the mobile wireless terminal system according to the present invention included figure is shown in FIG. 7.

A particular feature of the present invention is provision of a simultaneous dial-up channel in the form of TCH, as shown circled by dotted lines in FIG. 7. In other words, by splitting TCH into an individual dial-up channel and a simultaneous dial-up channel, the present invention performs TCH broadcasting by employing this TCH simultaneous dial-up channel.

In telephone calls between ordinary mobile wireless terminals, subscriber information for one mobile wireless terminal 2 such as individual dial-up number is recorded in a subscriber memory 6 of one switching center 3 (home location register), and one switching center 3 (visitor location register), located at the present location of this mobile wireless terminal 2, receives this subscriber information from the home location register, and connects the mobile wireless terminal 2 wirelessly to one base station 5. However, since a multiplicity of mobile wireless terminals use an identical dial-up number and/or ID number in the case of the TCH broadcasting according to the present invention, the information is transmitted to the respective home location register (the switching center 3 which has the subscriber memory 6) via a database for TCH broadcasting, and then sent simultaneously to a plurality of mobile wireless terminals via respective visitor location registers (the switching center 3 for the present location of the mobile wireless terminal).

As detailed above, the mobile wireless terminal system 1 allows a variety of information to be simultaneously transmitted to a plurality of mobile wireless terminals within a limited period, and an information provision service can be efficiently provided for a plurality of people that own mobile wireless terminals.

For information for TCH broadcasting which is low in urgency, the switching center 3 (telecommunications business) may select time ranges where a little wave traffic exists, such as in the early morning, and simultaneously transmit it within the time range to raise radio wave usage efficiency and lower transmission costs, thereby keeping charges for information provision low. Further, the more the mobile wireless terminals which receive TCH broadcasting are for an identical cell, the lower the transmission costs for each mobile wireless terminal are in inversely proportional to the number of mobile wireless terminals.

With the mobile wireless terminal system according to the present invention, identical information is simultaneously transmitted to mobile wireless terminals owned by individuals that have subscribed in order to receive information from a telecommunications business (switching center). Furthermore, with the mobile wireless terminal system according to the present invention, it is possible to simultaneously transmit information to the members of organizations such as government administration offices or enterprises who carry mobile wireless terminals having common dial-up telephone numbers and/or common ID numbers. This system may be employed especially for urgent notification in times of disasters such as earthquakes, fires and so forth.

Since received information is stored in a memory of the mobile wireless terminal, is printed in a printer, or collected and stored on the server, this information can subsequently be read out and displayed on the liquid crystal display in the mobile wireless terminal, or printed by connecting a printer to the memory.

Furthermore, the content of information for TCH broadcasting can be data for remote operation of a variety of devices located over a broad area, or data for the modification of data, or for the modification of software for computers or network devices disposed over a broad area.

As explained above, with the mobile wireless terminal system with TCH broadcasting function according to the present invention, recipient information (common dial-up numbers and/or common ID numbers) for TCH broadcasting is recorded in a plurality of mobile wireless terminals and in a single switching center or a plurality of switching centers (home location register(s)). The switching center then performs TCH broadcasting of information sent from information providers, based on the abovementioned recipient information, via a plurality of switching centers (visitor location registers), using a simulcasting frequency within the mobile wireless terminal usage band (or a frequency unoccupied at the time of the TCH broadcasting). Consequently, information is transmitted simultaneously to a plurality of mobile wireless terminals.

What is claimed is:

1. A mobile wireless terminal system with simultaneous transmission function, comprising:

a plurality of mobile wireless terminals;

a plurality of switching centers for said mobile wireless terminals; and an information provider connected to a telecommunications business owning said switching center;

wherein recipient information including dial-up numbers and/or ID numbers for simultaneous transmission is registered in said mobile wireless terminals and also in said switching center; and said switching center performs simultaneous transmission of information sent from said information provider, based on said recipient information, via a plurality of switching centers using a specific frequency allocated for a simultaneous transmission, which is common to said plurality of switching centers owned by a telecommunication business.

* * * * *